US012107877B2

(12) United States Patent
Clark et al.

(10) Patent No.: US 12,107,877 B2
(45) Date of Patent: *Oct. 1, 2024

(54) REAL-TIME DETECTION OF ANOMALOUS CONTENT IN TRANSMISSION OF TEXTUAL DATA

(71) Applicant: Bank of America Corporation, Charlotte, NC (US)

(72) Inventors: Elijah Clark, Charlotte, NC (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,318

(22) Filed: Jun. 6, 2023

(65) Prior Publication Data

US 2023/0319091 A1    Oct. 5, 2023

Related U.S. Application Data

(63) Continuation of application No. 16/581,957, filed on Sep. 25, 2019, now Pat. No. 11,711,385.

(51) Int. Cl.
*H04L 9/40* (2022.01)
*G06N 5/04* (2023.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/0428* (2013.01); *H04L 63/1416* (2013.01)

(58) Field of Classification Search
CPC ............. H04L 63/1425; H04L 63/0428; H04L 63/1416; H04L 63/1408; G06F 21/566;
(Continued)

(56) References Cited

U.S. PATENT DOCUMENTS 9,530,016 B1    12/2016  Pomerantz
9,565,202 B1    2/2017   Kindlund et al.
(Continued)

OTHER PUBLICATIONS

Hart M, et al. (2011) Text Classification for Data Loss Prevention. In: Fischer-Hubner S., Hopper N. (eds.) Privacy Enhancing Technologies. PETS 2011. Lecture Notes in Computer Science, vol. 6794. Springer, Berlin, Heidelber. https://doi.org.10.1007/978-3-642-22263-4_2 (20 pages) (Year 2011).

(Continued)

*Primary Examiner* — Joseph P Hirl
*Assistant Examiner* — Thomas A Gyorfi
(74) *Attorney, Agent, or Firm* — Banner & Witcoff, Ltd.

(57) ABSTRACT

Aspects of the disclosure relate to real-time detection of anomalous content in a transmission of textual data. A computing platform may monitor, in real-time and via a computing device, a transmission of textual data from a user device. Then, the computing platform may scan, via the computing device, a content of the textual data. The computing platform may then perform, via the computing device and based on the scanning, textual analysis of the scanned content. Subsequently, the computing platform may detect, in real-time and based on the textual analysis, an anomalous pattern indicative of secure enterprise information. Then, the computing platform may trigger, via the computing device, one or more security actions to prevent the transmission of the secure enterprise information.

20 Claims, 4 Drawing Sheets

(58) Field of Classification Search
CPC ...... G06F 21/6245; G06N 5/04; G06N 20/00; G06N 3/08
See application file for complete search history.

(56) References Cited

U.S. PATENT DOCUMENTS

| | | |
|---|---|---|
| 9,722,801 B2 | 8/2017 | Adams |
| 9,992,217 B2 | 6/2018 | Taylor et al. |
| 10,091,222 B1 | 10/2018 | Langton et al. |
| 11,711,385 B2 * | 7/2023 | Clark ..................... G06N 5/04 |
| 2015/0310188 A1 | 10/2015 | Ford et al. |
| 2017/0070518 A1 | 3/2017 | Manadhata et al. |
| 2017/0359220 A1 | 12/2017 | Weith et al. |
| 2018/0027006 A1 | 1/2018 | Zimmermann et al. |
| 2018/0054447 A1 | 2/2018 | Greevy |
| 2018/0183827 A1 | 6/2018 | Zorlular et al. |
| 2018/0191755 A1 | 7/2018 | Monaco et al. |
| 2018/0365560 A1 | 12/2018 | Qiao et al. |
| 2019/0036955 A1 | 1/2019 | Langton et al. |
| 2019/0108355 A1 | 4/2019 | Carson |
| 2019/0370468 A1 | 12/2019 | Soby et al. |
| 2021/0044603 A1 | 2/2021 | Annen et al. |

OTHER PUBLICATIONS

Kongsgård K.W., et al. Data Loss Prevention Based on Text Classification in Controlled Environments. In. Information Systems Security. ICISS 2016. Lecture Notes in Computer Science, vol. 10063. Springer Cham (pp. 131-150) htts:// doi.org/10.1007/978-3-319-49806-5_7 (Year: 2016).

* cited by examiner

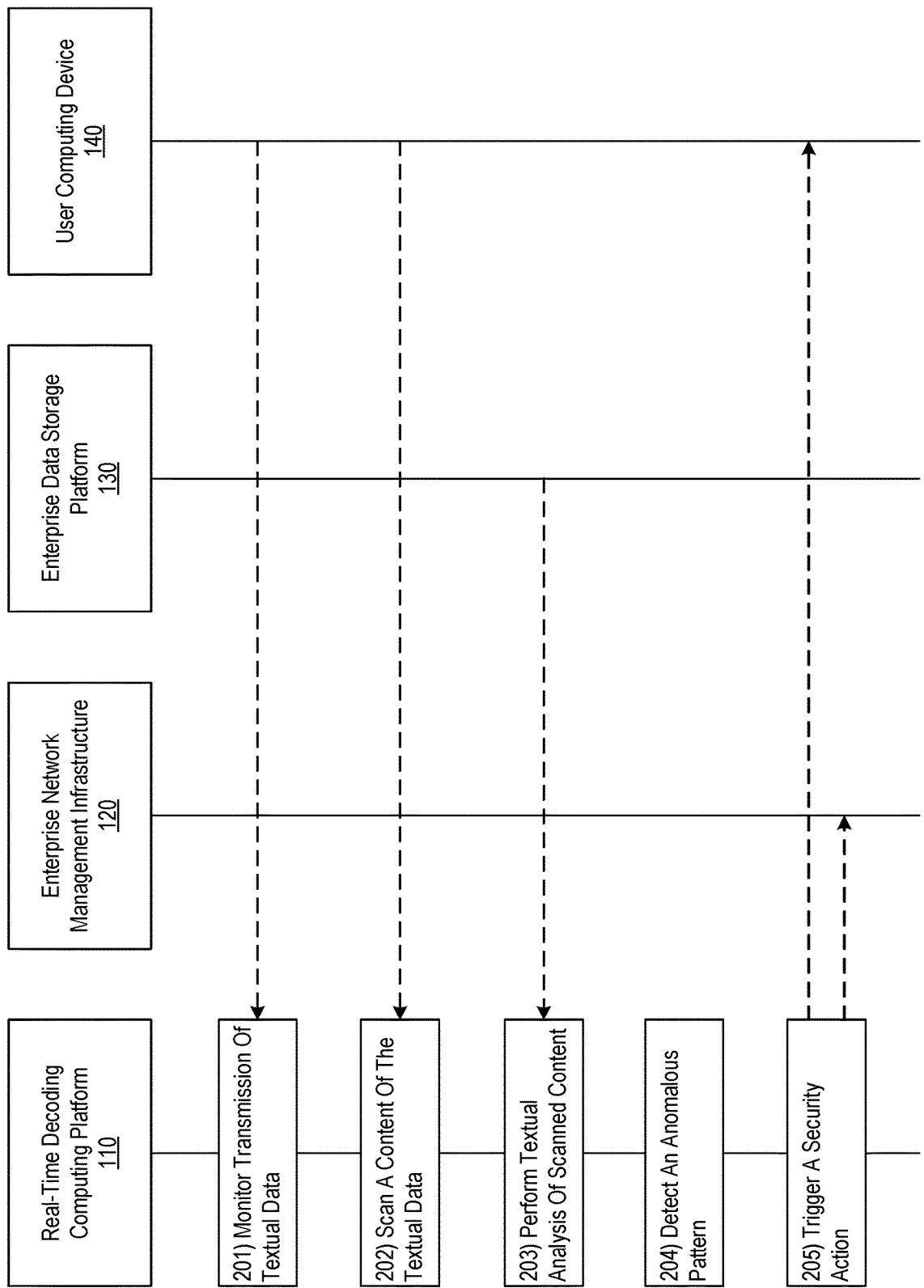

REAL-TIME DETECTION OF ANOMALOUS CONTENT IN TRANSMISSION OF TEXTUAL DATA

CROSS-REFERENCE TO RELATED APPLICATIONS

This application claims the benefit of and is a continuation of U.S. application Ser. No. 16/581,957, filed Sep. 25, 2019. The above application is incorporated by reference herein in its entirety.

BACKGROUND

Aspects of the disclosure relate to deploying digital data processing systems to protect enterprise resources. In particular, one or more aspects of the disclosure relate to real-time detection of anomalous content in a transmission of textual data.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to analyze potentially outbound communications to detect patterns, anomalies and so forth, that may be indicative of an attempt to disclose confidential information. As data flows through the network in real-time, such detection and management of network activity may be time-sensitive and might need to be performed in real-time as well. Ensuring that potential disclosure of confidential information is properly detected, and timely and targeted remediation measures are performed, in real time with speed and accuracy, may be particularly advantageous to ensure a smooth running of the enterprise infrastructure. In many instances, however, it may be difficult to analyze potentially outbound communications, with speed and accuracy, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time detection of anomalous content in a transmission of textual data.

In accordance with one or more embodiments, a computing platform having at least one processor, a communication interface, and memory may monitor, in real-time and via a computing device, a transmission of textual data from a user device. Then, the computing platform may scan, via the computing device, a content of the textual data. The computing platform may then perform, via the computing device and based on the scanning, textual analysis of the scanned content. Subsequently, the computing platform may detect, in real-time and based on the textual analysis, an anomalous pattern indicative of secure enterprise information. Then, the computing platform may trigger, via the computing device, one or more security actions to prevent the transmission of the secure enterprise information.

In some embodiments, the secure enterprise information may be in encrypted format, and the computing platform may decrypt, via the computing device, the anomalous pattern to identify the secure enterprise information.

In some embodiments, the secure enterprise information may be in numeric format, and the anomalous pattern may include the secure enterprise information in alphanumeric format.

In some embodiments, the secure enterprise information may be in alphanumeric format, and the anomalous pattern may include the secure enterprise information in an altered alphanumeric format.

In some embodiments, the anomalous pattern may include a portion of the content that deviates from a context of the content.

In some embodiments, the computing platform may perform the textual analysis based on a language model.

In some embodiments, the computing platform may train a machine learning model based on previously detected anomalous patterns.

In some embodiments, the computing platform may train a machine learning model to generate additional anomalous patterns. Then, the computing platform may detect the anomalous pattern based on the additional anomalous patterns.

In some embodiments, the textual data may include data associated with an electronic communication.

In some embodiments, the textual data may include data associated with an electronic document spooled for printing to a print device.

In some embodiments, the one or more security actions may include modifying, based on a machine learning model, the anomalous pattern to prevent a disclosure of the secure enterprise information.

In some embodiments, the one or more security actions may include modifying an access permission of an enterprise user associated with the user device.

In some embodiments, the one or more security actions may include generating, based on the monitoring, a risk profile of an enterprise user associated with the user device, where the risk profile may be indicative of a likelihood of the enterprise user to transmit secure enterprise information.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 2 depicts an illustrative event sequence for a real-time detection of anomalous content in a transmission of textual data in accordance with one or more example embodiments;

DETAILED DESCRIPTION

Figure 1A:
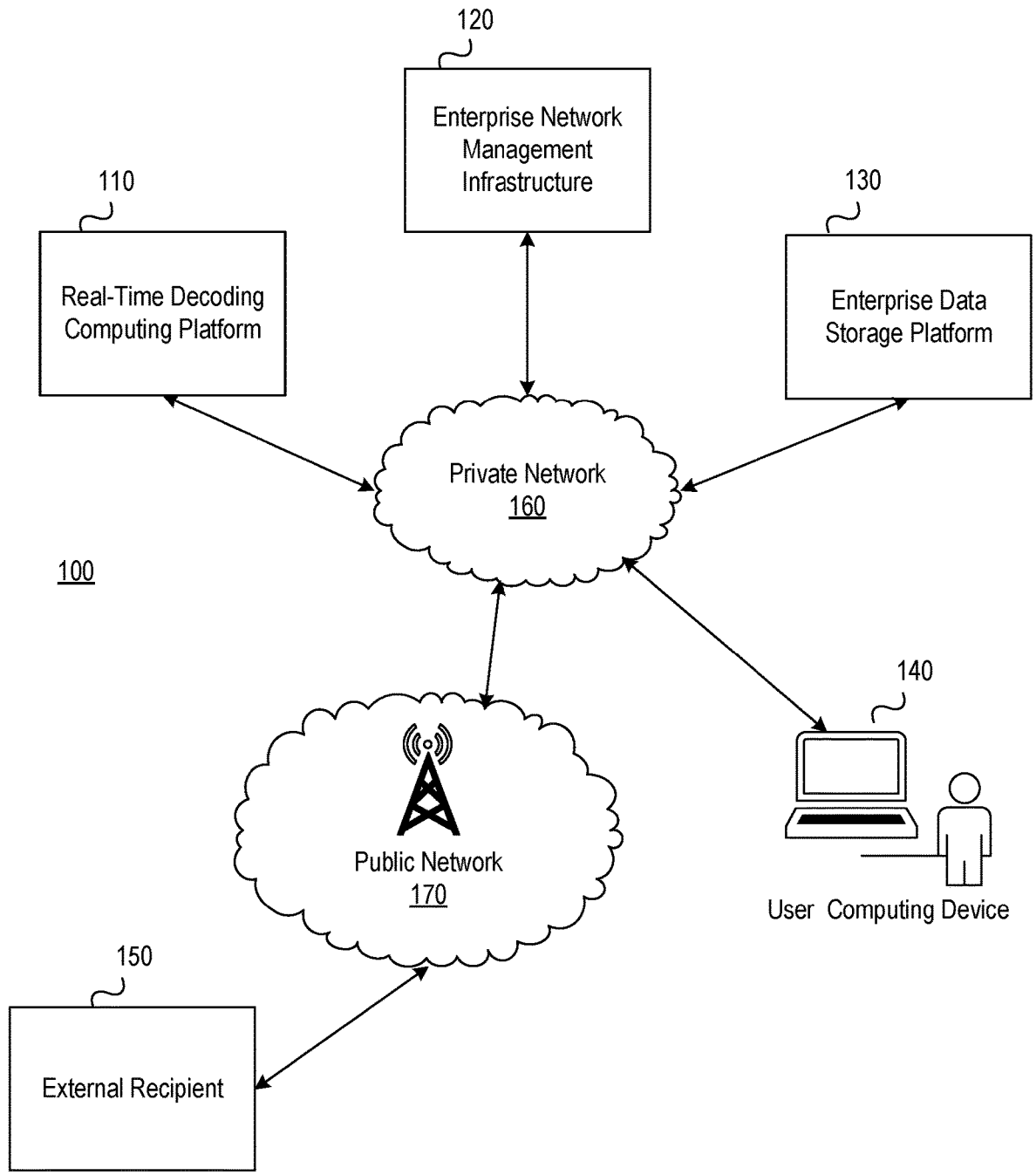
FIGS. 1A and 1B depict an illustrative computing environment for a real-time detection of anomalous content in a transmission of textual data in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to a real-time detection of anomalous content in a transmission of textual data, and triggering steps to mitigate the effects of such activity in a pro-active and timely manner. For example, an enterprise network management infrastructure may deploy computing resources such as network devices, web resources, electronic mail applications, and so forth. A large amount of textual data may be sent within electronic communications, via web content, and as part of print requests. In some instances, such textual data, unless adequately monitored, may pose a large security threat to the enterprise services. For large enterprise organizations with vast amounts of deployed resources and a large number of employees, potential data exfiltration may take varied and complex forms, and may require real-time monitoring. Generally, it is not possible to manually manage such a vast array of network users and devices, with near-continuous flow of data. Accordingly, it may be of great significance for a large enterprise organization (e.g., financial institution), with large amounts of confidential information to protect, to detect, in real-time, anomalous patterns indicative of secure enterprise information, and to trigger appropriate security measures.

Accordingly, aspects of this disclosure relate to automated monitoring of transmission of textual data to identify potentially disclosure of protected and/or confidential information in real-time, and initiate actions to prevent such potential disclosure. Identifying such potential disclosure via a manual process and/or based on mental steps is unlikely because it relates to vast amounts of real-time network data traffic, and such network data traffic is rapidly changing in real-time over thousands of enterprise resources. In some aspects, a manual detection of obfuscated content in textual data may not be possible, and may cause an enterprise organization to be vulnerable to cyber security incidents. Also, since the network data may reside and/or be exchanged over a vast array of users and network devices, it necessitates a use of computing devices to access the data over networks, detect patterns and/or anomalous behaviors in real-time as the data changes, and initiate relevant action in real-time and over the network. It may be noted, that as data transmissions occur over a computing network, the problem of detecting potentially harmful activities across an enterprise infrastructure arises in the realm of networks, and as described herein, a solution is necessarily rooted in computer technology to overcome a problem arising in the realm of computer networks.

Figure 1B:
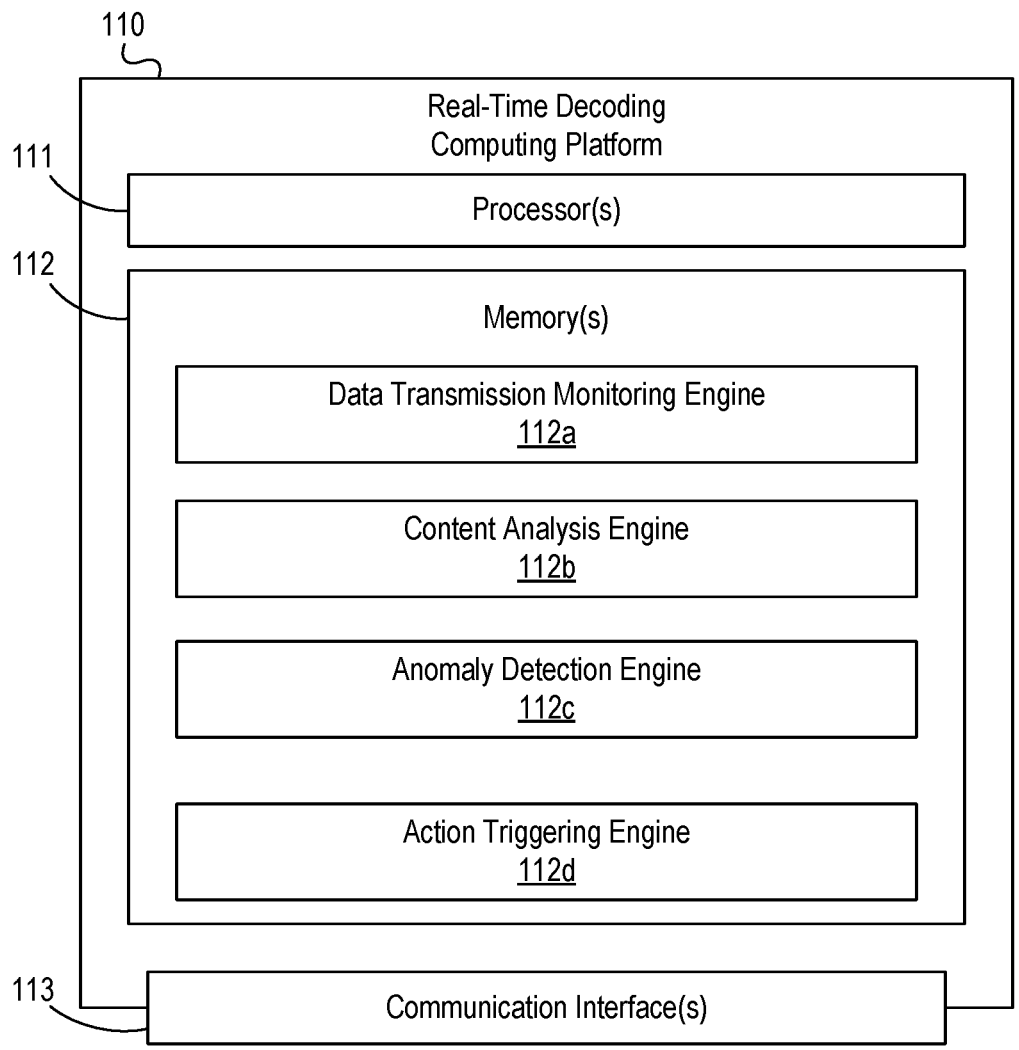

FIGS. 1A and 1B depict an illustrative computing environment for a real-time detection of anomalous content in a transmission of textual data in accordance with one or more example embodiments. Referring to FIG. 1A, computing environment 100 may include one or more computer systems. For example, computing environment 100 may include real-time decoding computing platform 110, enterprise network management infrastructure 120, enterprise data storage platform 130, user computing device 140, and external recipient 150.

As illustrated in greater detail below, real-time decoding computing platform 110 may include one or more computing devices configured to perform one or more of the functions described herein. For example, real-time decoding computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications. For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. For example, enterprise network management infrastructure 120 may include various servers and/or databases that may manage access controls to enterprise network devices. Additionally, or alternatively, enterprise network management infrastructure 120 may receive instructions from real-time decoding computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including access controls to network devices and/or other resources hosted, executed, and/or otherwise provided by enterprise network management infrastructure 120. Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

User computing device 140 may be a personal computing device (e.g., desktop computer, laptop computer) or mobile computing device (e.g., smartphone, tablet, wearable device). In addition, user computing device 140 may be linked to and/or used by a specific enterprise user (who may, e.g., be an employee or other affiliate of an enterprise organization operating real-time decoding computing platform 110). External recipient 150 may be an intended recipient of a transmission of textual data from user computing device 140. External recipient 150 may be a personal computing device (e.g., desktop computer, laptop computer) or mobile computing device (e.g., smartphone, tablet, wearable device).

Computing environment 100 also may include one or more networks, which may interconnect one or more of real-time decoding computing platform 110, enterprise network management infrastructure 120, enterprise data storage platform 130, user computing device 140, and external recipient 150. For example, computing environment 100 may include private network 160 (which may interconnect, for example, real-time decoding computing platform 110, enterprise network management infrastructure 120, and enterprise data storage platform 130, user computing device 140, and/or one or more other systems (which may be associated with an organization, such as a financial institution), and public network 170 (which may interconnect, for example, external recipient 150 with private network 160 and/or one or more other systems, public networks, subnetworks, and/or the like). For example, public network 170 may interconnect external recipient 150 with user computing device 140 via private network 160. In some instances, public network 170 may be a high generation cellular network, such as, for example, a fifth generation ("5G") or higher cellular network. In some instances, private network 160 may likewise be a high generation cellular enterprise network, such as, for example, a 5G or higher cellular network.

In one or more arrangements, real-time decoding computing platform 110, enterprise network management infrastructure 120, enterprise data storage platform 130, user computing device 140, and external recipient 150, and/or the other systems included in computing environment 100 may be any type of computing device capable of communicating with a user interface, receiving input via the user interface, and communicating the received input to one or more other computing devices. For example, real-time decoding computing platform 110, enterprise network management infrastructure 120, enterprise data storage platform 130, user computing device 140, and external recipient 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time decoding computing platform 110, enterprise network management infrastructure 120, enterprise data storage platform 130, user computing device 140, and external recipient 150, may, in some instances, be special-purpose computing devices configured to perform specific functions.

Referring to FIG. 1B, real-time decoding computing platform 110 may include one or more processors 111, memory 112, and communication interface 113. A data bus may interconnect processor 111, memory 112, and communication interface 113. Communication interface 113 may be a network interface configured to support communication between real-time decoding computing platform 110 and one or more networks (e.g., public network, private network, a local network, or the like). Memory 112 may include one or more program modules having instructions that when executed by processor 111 cause real-time decoding computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time decoding computing platform 110 and/or by different computing devices that may form and/or otherwise make up real-time decoding computing platform 110.

For example, memory 112 may have, store, and/or include data transmission monitoring engine 112a, content analysis engine 112b, anomaly detection engine 112c, and action triggering engine 112d. Data transmission monitoring engine 112a may have instructions that direct and/or cause real-time decoding computing platform 110 to monitor, in real-time and via a computing device, a transmission of textual data from a user device.

Content analysis engine 112b may have instructions that direct and/or cause real-time decoding computing platform 110 to scan, via the computing device, a content of the textual data. Content analysis engine 112b may also have instructions that direct and/or cause real-time decoding computing platform 110 to perform, via the computing device and based on the scanning, textual analysis of the scanned content. Anomaly detection engine 112c may have instructions that direct and/or cause real-time decoding computing platform 110 to detect, in real-time and based on the textual analysis, an anomalous pattern indicative of secure enterprise information. Action triggering engine 112d may have instructions that direct and/or cause real-time decoding computing platform 110 to trigger, via the computing device, one or more security actions to prevent the transmission of the secure enterprise information.

FIG. 2 depicts an illustrative event sequence for a real-time detection of anomalous content in a transmission of textual data in accordance with one or more example embodiments. Referring to FIG. 2, at step 201, real-time decoding computing platform 110 may monitor, in real-time and via a computing device, a transmission of textual data from a user device. Generally, transmission of textual data may occur in several forms, including, but not limited to, sending a document to a print device to make unauthorized copies of the document, sending an email, posting comments at a website, and so forth. In some embodiments, real-time decoding computing platform 110 may monitor an enterprise device via an application programming interface ("API"). In some embodiments, real-time decoding computing platform 110 may monitor an enterprise device via a device access manager, and/or device driver.

Although enterprise organizations may utilize traditional security defenses such as data loss prevention ("DLP"), such measures may not be adequate to monitor, detect, and/or prevent loss of information via internal actors and other insider threats. For example, monitoring data use policy violations and so forth may provide a front-line defense, but may be agnostic to more sophisticated attempts to disclose secure enterprise information.

In some embodiments, the textual data may include data associated with an electronic communication. For example, an enterprise user may initiate transmission of an electronic communication to external recipient 150 via user computing device 140, and the textual data may be a content of the electronic communication. In some embodiments, the textual data may be a content of one or more attachments associated with the electronic communication In some embodiments, the textual data may include data associated with an electronic document spooled for printing to a print device. For example, an enterprise user may not want to share a sensitive document with external recipient 150 via an electronic communication, and may decide to print the document. Accordingly, enterprise user may initiate transmission of the electronic document to be spooled to a print device, and the textual data may be a content of the electronic document.

At step 202, real-time decoding computing platform 110 may scan, via the computing device, a content of the textual data. For example, real-time decoding computing platform 110 may access the textual data and scan the content of the textual data. As used herein, the content of the textual data may include textual data such as a header, metadata, and so forth. For example, when the transmission is an electronic communication, the content of the textual data may include, for example, a body, a header, a subject, an attachment, and so forth. Real-time decoding computing platform 110 may utilize one or more techniques to scan the content of the textual data. For example, real-time decoding computing platform 110 may perform optical character recognition ("OCR") to scan the content of the textual data. In some embodiments, a neural network-based methodology may be utilized to recognize the textual data (e.g., for hand-written documents).

At step 203, real-time decoding computing platform 110 may perform, via the computing device and based on the scanning, textual analysis of the scanned content. A textual analysis of the content may be performed, for example, based on natural language processing, part-of-speech tagging, parsing, maximum entropy language models, neural networks, and so forth.

In some embodiments, real-time decoding computing platform 110 may perform the textual analysis based on a language model. Generally, a language model may be a probability distribution over a collection of words. In some instances, the language model may depend on a set of words that appeared previously (e.g., unigram models, n-gram models, bidirectional models, and so forth). In some embodiments, a language model may differentiate between two collections of words that may sound similar but have different meanings. For example, the collections of words, "lets meet for wine" and "lets meet at nine" sound similar, but have different meanings.

At step 204, real-time decoding computing platform 110 may detect, in real-time and based on the textual analysis, an anomalous pattern indicative of secure enterprise information. Many large enterprises, such as, for example, financial institutions, may utilize various computing infrastructure to transact business with their customers. Such transactions may include secure enterprise information, such as confidential information, protected information, and/or other sensitive data that is created and/or used for various purposes. It is therefore a very high priority to protect the integrity and confidentiality of the underlying secure enterprise information and deter a breach of confidentiality, and/or data privacy.

In some instances, there may be an attempt to disclose confidential and/or protected information to parties external to the organization. For example, an enterprise user with access to confidential information may attempt to disclose such information to an external party. Such an attempt may include, in some instances, an electronic communication where secure enterprise information is obfuscated. For example, secure enterprise information may be intertwined into a sentence, or converted to another form. Accordingly, an ability to recognize a context of the electronic communication may be an important factor to detect an anomaly.

For example, an electronic communication may include the following textual data: "The three weather seven is seven balmy one and four winds are two gusting seven north six at 20 mph." In some embodiments, based on natural language processing methods, real-time decoding computing platform 110 may detect that this sentence is anomalous and does not conform to a standard sentence in the English language. Accordingly, real-time decoding computing platform 110 may identify a pattern of alphabetic forms of numeric characters interspersed within the sentence. Real-time decoding computing platform 110 may detect the alphabetic forms of the numeric characters as "377141276." Real-time decoding computing platform 110 may retrieve data from an enterprise data storage platform (e.g., enterprise data storage platform 130) to identify an association between "377141276" and a format for a social security number of an individual. Accordingly, real-time decoding computing platform 110 may infer "377141276" to likely be a social security number, "377-14-1276," of an individual. In some embodiments, real-time decoding computing platform 110 may consider various permutations of the sequence of numbers "3, 7, 7, 1, 4, 1, 2, 7, 6" as potentially secure enterprise information. Accordingly, real-time decoding computing platform 110 may detect such an anomalous pattern indicative of the secure enterprise information (e.g., social security number of an individual).

As another example, an enterprise user may utilize a key such as, for example, "0→D, 1→F, 2→H, 3→J, 4→L, 5→N, 6→P, 7→R, 8→T, 9→V" or "0→A, 2→B, 4→C, 6→D, 8→E, 1→F, 3→G, 3→H, 7→I, 9→J" to attempt to transmit a thousand social security numbers. Generally, such a message may be allowed to be transmitted as the content of the textual data may simply appear to be garbled text. However, as described herein, real-time decoding computing platform 110 may identify the pattern, via the computing device, and identify the secure enterprise information as a string of social security numbers.

In some embodiments, the secure enterprise information may be in encrypted format, and real-time decoding computing platform 110 may decrypt, via the computing device, the anomalous pattern to identify the secure enterprise information. For example, information in the textual data may be encrypted using an encryption method. For example, various methods, including but not limited to, a data encryption standard ("DES") algorithm, a Triple DES algorithm, an advanced encryption standard ("AES") algorithm, Blowfish, Twofish, Diffie-Hellman Key Exchange, RSA (named after Rivest, Shamir, and Adleman) public-key cryptosystem, ElGamal encryption, elliptic curve cryptography, hashing techniques, format-preserving encryption, key stretching, and so forth. Accordingly, real-time decoding computing platform 110 may decrypt, via the computing device, the anomalous pattern in encrypted format to identify the secure enterprise information. In some embodiments, a machine learning model may be trained to learn the various methods of encryption, associate an anomalous pattern to an encryption standard, and apply a respective decryption algorithm, to decrypt the anomalous pattern.

In some embodiments, the secure enterprise information may be in numeric format, and the anomalous pattern may include the secure enterprise information in alphanumeric format. For example, the secure enterprise information may be a date of birth in numeric format, such as, for example, "Aug. 18, 1987," and the anomalous pattern may include the secure enterprise information in alphanumeric format, such as, for example, "eighth, eighteenth, 1987," "eighteen, eighth, 1987," "eighth, eighteenth, nineteen eighty-seven," and so forth.

In some embodiments, "Aug. 18, 1987," may be represented as "hahaihg." Based on text processing methods, real-time decoding computing platform 110 may detect the string "hahaihg" as an anomalous pattern, and may associate the letters of the alphabet to numbers by identifying "h" as the eighth letter and therefore corresponding to the number "8", "a" as the first letter and therefore corresponding to the number "1", "i" as the ninth letter and therefore corresponding to the number "9", and "g" as the seventh letter and therefore corresponding to the number "7." Accordingly, real-time decoding computing platform 110 may convert "hahaihg" to "8181987," and may infer "8, 18, and 1987" to likely be a date of birth, "Aug. 18, 1987," of an individual.

In some embodiments, "Aug. 18, 1987," may be represented as "mfmfnml." Based on text processing methods, real-time decoding computing platform 110 may detect the string "mfmfnml" as an anomalous pattern, and may associate the letters of the alphabet to numbers by identifying "m" as "8", and then by mapping letters of the alphabet to this information, real-time decoding computing platform 110 may further identify "n" as "9" ("n" is next to "m" in the alphabet), and "l" as "7" ("l" precedes "m" in the alphabet), and "f" as "1." Accordingly, real-time decoding computing platform 110 may convert "mfmfnml" to "8181987," and may infer "8, 18, and 1987" to likely be a date of birth, "Aug. 18, 1987," of an individual.

Although examples provided herein may correspond to elementary patterns, such examples are provided for illustrative purposes only. Additional and/or alternative means of representing the anomalous pattern may be used. For example, an association between the letters of the alphabet and numbers may be selected randomly, and in some instances, real-time decoding computing platform 110 may detect the pattern. Also, for example, noise may be added to the anomalous pattern. For example, in a representation of "Aug. 18, 1987," as "mfmfnml" additional characters may be inserted, and a modified representation may be, for example, "mxfxmxfxnxmxl," or "xxmfmfnmlxx," and so forth. Also, for example, a modified representation may not conform to an exact data match, for example, the modified representation may not be format preserving (e.g., social security numbers may not comprise 9 digits, credit card numbers may not comprise 16 digits, and so forth). However, real-time decoding computing platform 110 may detect patterns with formats similar to known formats to detect the anomalous patterns. Also, in some embodiments, even if real-time decoding computing platform 110 is unable to decode the anomalous pattern to identify the secure enterprise information, it may detect the anomalous pattern as indicative of an attempt to obfuscate secure enterprise information.

As another example, the secure enterprise information may be a credit card number in numeric format, such as, for example, "7177 6646 3277 1813," and the anomalous pattern may include the secure enterprise information in alphanumeric format, such as, for example, "seven one seven seven 6 six four 6 three two seven seven one eight 1 three." Also, for example, the secure enterprise information may be a social security number in numeric format, such as, for example, "312-477-5150," and the anomalous pattern may include the secure enterprise information in alphanumeric format, such as, for example, "cabdggeaez." Generally, confidential information such as numeric codes (e.g., a card verification value ("CVV"), an access PIN, last four digits of a social security number, and so forth) may be represented in alphanumeric format.

In some embodiments, the secure enterprise information may be in alphanumeric format, and the anomalous pattern may include the secure enterprise information in an altered alphanumeric format. For example, a date of birth in alphanumeric format, such as, for example, "Aug. 18, 1987," may be represented in an altered alphanumeric format, such as, "mfm1987," and real-time decoding computing platform 110 may convert "mfm1987" to "8181987," and may infer "8, 18, and 1987" to likely be a date of birth, "Aug. 18, 1987," of an individual. Also, for example, passwords to various enterprise resources may be in alphanumeric form, and may be obfuscated as described herein. In some embodiments, real-time decoding computing platform 110 may detect such patterns of obfuscation via a machine learning model. As described herein, even if real-time decoding computing platform 110 may not be able to decode the actual password, it may detect a string of characters that are 8-, 10-, 12-characters long, as potential candidates for passwords. Accordingly, real-time decoding computing platform 110 may flag such communication for further analysis. In some embodiments, if such an anomalous pattern is determined to be obfuscated secure enterprise information, then this may be provided as labeled training data to train a machine learning model.

In some embodiments, the anomalous pattern may include a portion of the content that deviates from a context of the content. For example, a sentence such as "lets meet john adams at nine fifteen in room 1958" may be a harmless communication in a context of setting up a meeting with another individual or group. However, if the same sentence appears in a different context, it may be indicative of an attempt to obfuscate secure enterprise information. For example, consider a series of sentences as follows: "Your deposit has been reviewed and is awaiting verification. Let's meet john adams at nine fifteen in room 1958. Please log into your secure message center to verify your deposit amount by clicking on the link provided." In this example, the sentence "Lets meet john adams at nine fifteen in room 1958" appears to be out of context, and/or not relevant to a deposit verification. In some instances, such a communication may be an attempt to communicate secure enterprise information. Accordingly, real-time decoding computing platform 110 may detect such an anomaly, and identify 9, 15, and 1958 from a combination of numeric and alphanumeric characters. In some embodiments, real-time decoding computing platform 110 may retrieve data from an enterprise data storage platform (e.g., enterprise data storage platform 130) to identify an association between "9, 15, and 1958" and a format for a date of birth. Accordingly, real-time decoding computing platform 110 may infer "9, 15, and 1958" to likely be a date of birth, "Sep. 15, 1958," of an individual named "John Adams." Accordingly, real-time decoding computing platform 110 may detect such an anomalous pattern indicative of the secure enterprise information (e.g., date of birth of an individual).

In some embodiments, real-time decoding computing platform 110 may store, in enterprise data storage platform (e.g., enterprise data storage platform 130), anomalous patterns that were previously detected and/or decoded may be stored as a rule in an enterprise data storage platform (e.g., enterprise data storage platform 130). For example, real-time decoding computing platform 110 may store a rule such as "associate a letter of the alphabet with a numeral in the corresponding position," or "add a numeral to a position of a letter of the alphabet, and associate with a numeral," or "add a random numeral to a position of a letter of the alphabet, and associate with a numeral," or "perform a random permutation of the letters of the alphabet, and associate a new position of a letter with a corresponding numeral." Also, for example, real-time decoding computing platform 110 may store a rule for an anomalous pattern such as, "if characters are <number 1>, word 1, <number 2>, word 2, . . . , <number K>, word K>, then extract string number 1, number 2, . . . , number K."

Also, for example, real-time decoding computing platform 110 may store, in enterprise data storage platform (e.g., enterprise data storage platform 130), associations between known formats for confidential information. For example, associate "social security number" with "9 digits", "birth date" with "8 digits", "credit card number" with "16 digits", "CVV number" with "3 digits", and so forth.

In some embodiments, real-time decoding computing platform 110 may train a machine learning model based on previously detected anomalous patterns. For example, real-time decoding computing platform 110 may train a machine learning model to recognize anomalous patterns that were previously detected. In some embodiments, additional detection rules may be input into real-time decoding computing platform 110.

In some examples, the training may be unsupervised. For example, the machine learning model may utilize an output of text processing of the textual data to learn to detect anomalous patterns. For example, identifying an anomalous pattern based on a context of the content may be a form of unsupervised learning. For example, cluster analysis may be utilized to group historical textual data, identify shared attributes, and create rules for pattern recognition based on such rules. One or more neural network models may be utilized to train the machine learning model.

Unsupervised learning may be utilized, for example, to detect unknown patterns. For example, the machine learning model may analyze large volumes of textual data with secure enterprise information obfuscated in various manners. Based on such analysis, the machine learning model may detect hidden patterns in the information. Also, for example, as more data is intercepted via the networks (e.g., unlabeled data), the machine learning model may continually learn to detect additional patterns. Many available techniques for unsupervised learning may be utilized, such as, for example, clustering, partitioning, agglomerative, clustering of data based on fuzzy sets, probabilistic clustering, and so forth. Also, for example, clustering techniques may include, for example, hierarchical clustering, K-means clustering, singular value decomposition, principal component analysis ("PCA"), and so forth.

In some embodiments, real-time decoding computing platform 110 may train a machine learning model based on supervised learning methods. For example, labeled data may be provided to the machine learning model. For example, one or more rules may be provided to the machine learning model. Also, for example, when real-time decoding computing platform 110 detects an anomalous pattern, this may be verified as anomalous or not by a domain expert, and such labeled data may be provided to the machine learning model.

Given the large volumes of data generated over the networks, much of the training data may not be labeled. Accordingly, real-time decoding computing platform 110 may also train the machine learning model based on semi-supervised learning methods. For example, some of the textual data in the electronic communication may be identified as anomalous patterns by domain experts, and may be provided to the machine learning model as labeled data.

In some embodiments, real-time decoding computing platform 110 may train a machine learning model to generate additional anomalous patterns. As described herein, the machine learning model may detect additional patterns based on an analysis of historical data. Also, for example, the machine learning model may generate additional patterns, such as, for example, based on unsupervised learning techniques. Also, for example, the machine learning model may generate additional patterns from existing patterns. For example, upon detecting an anomalous pattern "<number 1>, word, <number 2>, word, . . . , <number K>, word>," the machine learning model may generate additional patterns such as "<number 1>, <number 2>, word 1, number 3>, <number 4>, word 2 . . . , <number K1>, <number K2>, word K>," and other combinations of letters and numbers. Also, for example, upon detecting 16 digits for a credit card number, the machine learning model may permute the numbers to generate additional patterns that are feasible credit card numbers. Then, real-time decoding computing platform 110 may detect the anomalous pattern based on the additional anomalous patterns.

Generally, if real-time decoding computing platform 110 fails to detect an anomalous pattern, the transmission of the textual data may be allowed to proceed. For example, if real-time decoding computing platform 110 analyzes an electronic communication and fails to detect an anomalous pattern, the electronic communication may be allowed to be transmitted to an intended recipient. As another example, if real-time decoding computing platform 110 analyzes a document spooled to be printed and fails to detect an anomalous pattern, the document may be allowed to proceed to be spooled to the print device.

At step 205, real-time decoding computing platform 110 may trigger, via the computing device, one or more security actions to prevent the transmission of the secure enterprise information. Generally, upon detecting a potential disclosure of secure enterprise information, real-time decoding computing platform 110 may prevent further transmission of the electronic communication. For example, the electronic communication may be initially stalled from leaving the enterprise network (by placing it in a separate outgoing mail box). Upon review and analysis as described herein, if real-time decoding computing platform 110 detects an anomalous pattern (regardless of whether the anomalous pattern is decoded to determine the secure enterprise information), then the electronic communication may be removed from the mail outbox, and prevented from being transmitted to an external destination (e.g., external recipient 150).

In some embodiments, the one or more security actions may include modifying, based on a machine learning model, the anomalous pattern to prevent a disclosure of the secure enterprise information. For example, real-time decoding computing platform 110 may, via the computing device, remove the secure enterprise information, or otherwise alter it, prior to transmission. For example, real-time decoding computing platform 110 may replace the detected secure enterprise information (or anomalous content) with alternative content, thereby preventing its disclosure. However, real-time decoding computing platform 110 may cause the electronic communication to be transmitted to identify a recipient, and/or take further security measures.

In some embodiments, the one or more security actions may include modifying an access permission of an enterprise user associated with the user device. For example, upon detecting an anomalous pattern in an electronic communication associated with an enterprise user, real-time decoding computing platform 110 may modify one or more access permissions for the enterprise user. For example, real-time decoding computing platform 110 may prevent the enterprise user from accessing an external web site, may prevent the enterprise user from sending electronic mails (or not allow the enterprise user to attach documents), may change access permissions to enterprise resources and applications, may suspend or otherwise downgrade the enterprise user's security clearance, may notify enterprise security personnel of unauthorized activity, and/or suspected security breach, provide an alert to the enterprise user, alert a chain of management superior to the enterprise user, and so forth.

Also, for example, if a document is spooled for printing, and an anomalous pattern is detected, then real-time decoding computing platform 110 may automatically remove the document form the print queue, and/or suspend the enterprise user's ability to send another document to print, until the security threat is adequately resolved.

In some embodiments, the one or more security actions may include generating, based on the monitoring, a risk profile of an enterprise user associated with the user device, where the risk profile may be indicative of a likelihood of the enterprise user to transmit secure enterprise information. For example, a risk profile may be associated with an enterprise user based on a number of times an anomalous pattern is detected. For example, each enterprise user may be associated with a numerical score indicative of a number of times unauthorized activity may be identified. In some embodiments, the risk profile may be based on a type of role for the enterprise user. For example, an enterprise user associated with access to highly confidential material may have a higher risk score associated with them. For example, if an anomalous pattern activity is detected and is associated with an enterprise user with a lower security profile (e.g., a front desk reception personnel), a lower risk score may be associated with such activity. However, if an anomalous pattern activity is detected and is associated with an enterprise user with a higher security profile (e.g., an executive with access to highly privileged information), a higher risk score may be associated with such activity. In some embodiments, the machine learning model may identify security profiles based on existing access permissions associated with business roles, and may automatically determine a type of multiplier to be applied to an enterprise user's risk score based on a business role of the enterprise user.

Although the techniques and examples described herein are in the English language with Arabic numerals, this is for illustrative purposes only. For example, real-time decoding computing platform 110 may utilize the techniques described herein in any language or numeric format, as well as apply the techniques to a combination of languages, symbols, characters, numerals, fonts, and so forth. Also, for example, as the machine learning model is trained, processing speeds would increase.

Figure 3:
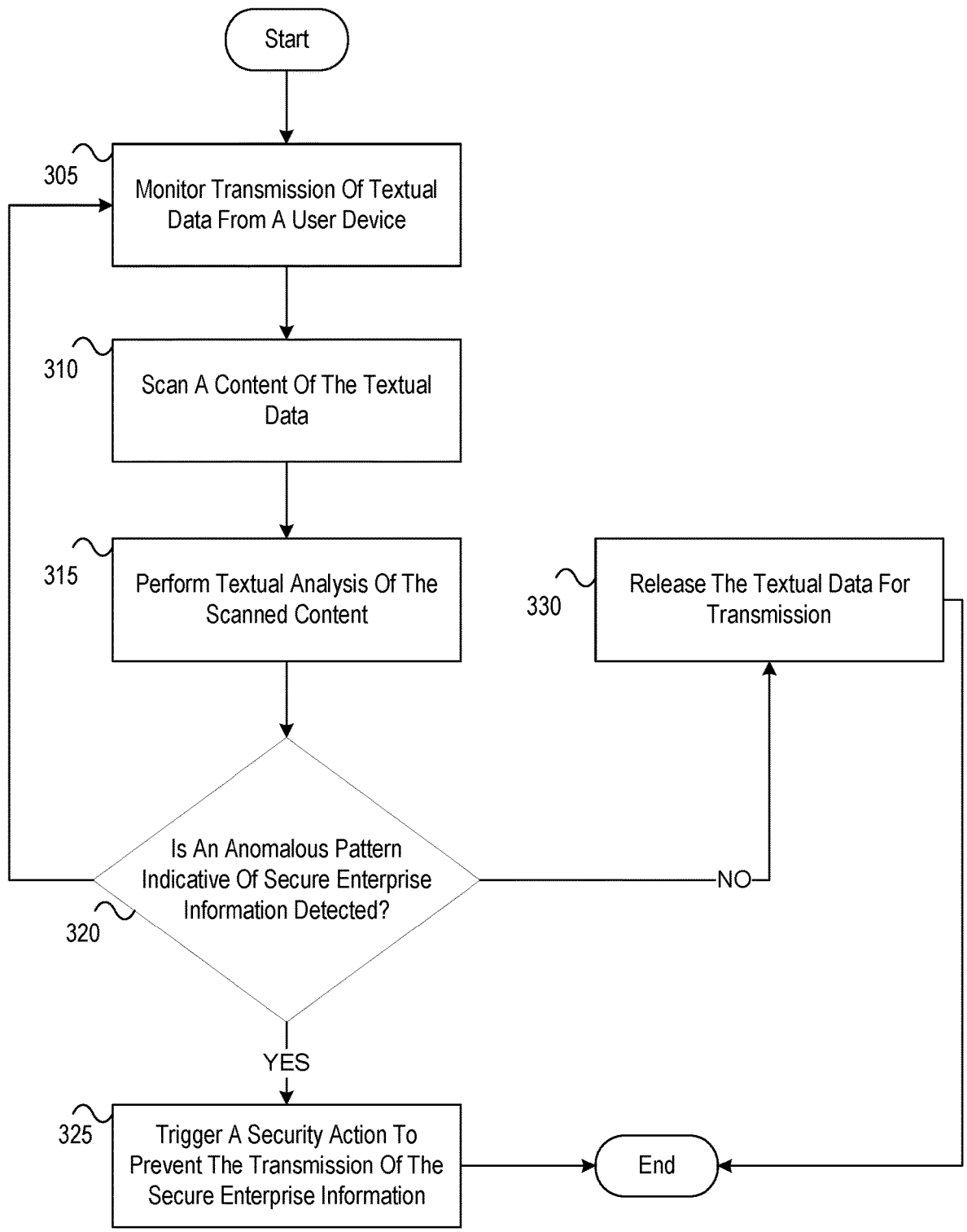
FIG. 3 depicts an illustrative method for a real-time detection of anomalous content in a transmission of textual data in accordance with one or more example embodiments.

FIG. 3 depicts an illustrative method for a real-time detection of anomalous content in a transmission of textual data in accordance with one or more example embodiments. Referring to FIG. 3, at step 305, a computing platform having at least one processor, a communication interface, and memory may monitor, in real-time and via a computing device, a transmission of textual data from a user device. At step 310, the computing platform may scan, via the computing device, a content of the textual data. At step 315, the computing platform may perform, via the computing device and based on the scanning, textual analysis of the scanned content.

At step 320, the computing platform may determine, in real-time and based on the textual analysis, if an anomalous pattern indicative of secure enterprise information is detected. If at step 320, the computing platform determines that an anomalous pattern indicative of secure enterprise information is not detected, the process moves to step 330. At step 330, the computing platform may release the textual data for transmission. If at step 320, the computing platform determines that an anomalous pattern indicative of secure enterprise information is detected, the process may proceed to step 325. At step 325, the computing platform may trigger, via the computing device, one or more security actions to prevent the transmission of the secure enterprise information. Also, at step 320, in some embodiments, the process may return to step 305 to continue monitoring future transmissions for anomalous patterns.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   detect an anomalous pattern indicative of secure enterprise information;
   determine that the detected anomalous pattern comprises obfuscated secure enterprise information;
   provide the detected anomalous pattern as labeled training data to train a machine learning model for obfuscated information; and
   trigger, via a computing device, one or more security actions to prevent a transmission of the secure enterprise information, wherein the one or more security actions comprises generating a risk profile of an enterprise user associated with a user device and wherein the risk profile is indicative of a likelihood of the enterprise user to transmit secure enterprise information and is based on a number of times unauthorized activity was identified in conjunction with a business role of the enterprise user.

2. The computing platform of claim 1, wherein the secure enterprise information is in encrypted format, and wherein the memory stores additional computer-readable instructions that, when executed by the at least one processor, cause the computing platform to:
   decrypt, via the computing device, the anomalous pattern to identify the secure enterprise information.

3. The computing platform of claim 1, wherein the secure enterprise (Original) information is in numeric format, and wherein the anomalous pattern comprises the secure enterprise information in alphanumeric format.

4. The computing platform of claim 1, wherein the secure enterprise information is in alphanumeric format, and wherein the anomalous pattern comprises the secure enterprise information in an altered alphanumeric format.

5. The computing platform of claim 1, wherein the memory stores additional computer-readable instructions that, when executed by the at least one processor, cause the computing platform to:
   monitor a transmission of textual data from the user device;
   scan a content of the textual data; and
   perform, based on the scanning, textual analysis of the scanned content.

6. The computing platform of claim 5, wherein the anomalous pattern comprises a portion of the content that deviates from a context of the content.

7. The computing platform of claim 5, wherein the instructions to perform the textual analysis comprise additional computer-readable instructions that, when executed by the at least one processor, cause the computing platform to:
   perform the textual analysis based on a language model.

8. The computing platform of claim 1, wherein the instructions to detect the anomalous pattern comprise additional computer-readable instructions that, when executed by the at least one processor, cause the computing platform to:
   train the machine learning model based on previously detected anomalous patterns.

9. The computing platform of claim 1, wherein the instructions to detect the anomalous pattern comprise additional computer-readable instructions that, when executed by the at least one processor, cause the computing platform to:
   train the machine learning model to generate additional anomalous patterns; and
   detect the anomalous pattern based on the additional anomalous patterns.

10. The computing platform of claim 5, wherein the textual data comprises data associated with an electronic communication.

11. The computing platform of claim 5, wherein the textual data comprises data associated with an electronic document spooled for printing to a print device.

12. The computing platform of claim 5, wherein the one or more security actions comprises preventing the transmission of the textual data.

13. The computing platform of claim 1, wherein the one or more security actions comprises modifying, based on the machine learning model, the anomalous pattern to prevent a disclosure of the secure enterprise information.

14. The computing platform of claim 1, wherein the one or more security actions comprises modifying an access permission of an enterprise user associated with the user device.

15. The computing platform of claim 1, wherein the secure enterprise information is in an encrypted format, and wherein the memory stores additional computer-readable instructions that, when executed by the at least one processor, cause the computing platform to:
   modify, based on the machine learning model, the anomalous pattern.

16. A method, comprising:
   at a computing platform comprising at least one processor, a communication interface, and memory:
   detecting an anomalous pattern indicative of secure enterprise information; and
   triggering, via a computing device, one or more security actions to prevent a transmission of the secure enterprise information, wherein the one or more security actions comprises generating a risk profile of an enterprise user associated with a user device and wherein the risk profile is indicative of a likelihood of the enterprise user to transmit secure enterprise information and is based on a number of times unauthorized activity was identified in conjunction with a business role of the enterprise user.

17. The method of claim 16, wherein the secure enterprise information is in numeric format, and wherein the anomalous pattern comprises the secure enterprise information in alphanumeric format.

18. The method of claim 16, wherein the detecting the anomalous pattern further comprises:
   training a machine learning model based on previously detected anomalous patterns.

19. The method of claim 16, wherein the detecting the anomalous pattern further comprises:
   training a machine learning model to generate additional anomalous patterns; and
   detecting the anomalous pattern based on the additional anomalous patterns.

20. One or more non-transitory computer-readable media storing instructions that, when executed by a computing platform comprising at least one processor, a communication interface, and memory, cause the computing platform to:
- detect an anomalous pattern indicative of secure enterprise information;
- determine that the detected anomalous pattern comprises obfuscated secure enterprise information;
- provide the detected anomalous pattern as labeled training data to train a machine learning model for obfuscated information; and
- trigger, via a computing device, one or more security actions to prevent a transmission of the secure enterprise information, wherein the one or more security actions comprises generating a risk profile of an enterprise user associated with a user device and wherein the risk profile is indicative of a likelihood of the enterprise user to transmit secure enterprise information and is based on a number of times unauthorized activity was identified in conjunction with a business role of the enterprise user.

\* \* \* \* \*